United States Patent [19]

Mehltretter

[11] Patent Number: 5,501,325
[45] Date of Patent: Mar. 26, 1996

[54] PACKING-CONTAINER SYSTEM FOR COILS OF MAGNETIC TAPE

[75] Inventor: Michael Mehltretter, Munich, Germany

[73] Assignee: IBSM Mehltretter GmbH, Munich, Germany

[21] Appl. No.: 137,059

[22] PCT Filed: Mar. 4, 1992

[86] PCT No.: PCT/EP92/00487

§ 371 Date: May 4, 1994

§ 102(e) Date: May 4, 1994

[87] PCT Pub. No.: WO92/18979

PCT Pub. Date: Oct. 29, 1992

[30] Foreign Application Priority Data

Apr. 22, 1991 [DE] Germany ............... 9104918 U

[51] Int. Cl.⁶ .................................................. B65D 85/671
[52] U.S. Cl. ........................ 206/303; 206/307; 206/394
[58] Field of Search ................................ 206/391, 394, 206/393, 444, 303, 307

[56] References Cited

U.S. PATENT DOCUMENTS 5,086,919  2/1992  Toral et al. ..................... 206/394
5,094,346  3/1992  Sommerfeldt et al. ............ 206/394
5,287,964  2/1994  Jacquand et al. ................. 206/391

FOREIGN PATENT DOCUMENTS 0328260  8/1989  European Pat. Off. .

OTHER PUBLICATIONS

Patent Abstracts of Japan, Section P, vol. 11, No. 366, published 28 Nov. 1987, p. 2 P 641, Kokai-No. 62-137,788 (Hatachi Ltd.).
Patent Abstracts of Japan, Section P, vol. 9, No. 246, published 03 Nov. 1985, p. 125 P 393, Kokai No. 60-98, 589 (Zeneraru K.K.).

Primary Examiner—Jimmy G. Foster
Attorney, Agent, or Firm—Oblon, Spivak, McClelland, Maier, & Neustadt

[57] ABSTRACT

Packaging device, in particular for magnetic tape reels or socalled pancakes, with an inner collecting tank and an outer support frame, which totally encloses the collecting tank. The collecting tank, which has closed walls and can be closed on the front side by a removeable plate, is attached on a rear side so as to hang freely on the support frame, which is designed as a framwork construction with stiles and rungs. The collecting tank has several receiving mechanisms for the magnetic tape reels that are to be packaged and that enable the packaging device to be automatically loaded and unloaded.

19 Claims, 3 Drawing Sheets

PACKING-CONTAINER SYSTEM FOR COILS OF MAGNETIC TAPE

SPECIFICATION

The invention relates to a packaging device for reels of magnetic tape.

BACKGROUND ART

Magnetic tape reels that usually exhibit a diameter of up to approximately 40 cm and comprise a plurality of precisely stacked tape windings are called pancakes. These pancakes represent with respect to their fabrication and the kind of the materials used a cost intensive intermediate product, which must be transported over sometimes very far distances from the manufacturer to the further processing operations. During such transport, however, it must be guaranteed that the pancakes wound with great precision do not warp due to excessive jolts or become damaged due to dirt. For this reason time-consuming packaging of the magnetic tape reels is necessary for safe transport.

Packaging devices that are suitable for receiving a single pancake are known, for example, from the prior art. These packaging devices are usually made of vibration- and impact-absorbing material, for example Styropor, so that the pancake is protected against dangerous vibrations and impact shock. Moreover, such a packaging material has the property that it deforms elastically upon impact and thus the energy that could result in the pancake being damaged is absorbed. The packaging design according to the prior art anticipates that the packaging will be intentionally deformed or even destroyed upon impact in order to protect its content and is designed consequently in principle as a disposable packaging. However, such a packaging creates in light of the required quantities a significant disposal problem; also high packaging costs or packaging material costs are associated with this method.

DISCLOSURE OF THE INVENTION

The invention is based on the problem of providing an inexpensive, reusable packaging device for safe transport of magnetic tape reels or socalled pancakes.

This problem with a packaging device of its class is solved by means of the present invention. The packaging volume for each pancake is drastically reduced by packing several pancakes into a collecting tank, thus reducing the packaging costs. Transfer of the outer vibrations to the collecting tank is damped by means of the force-absorbing positioning of the collecting tank within the support frame. In addition, forces acting from the outside are absorbed by the support frame, so that the collecting tank is not significantly deformed or even destroyed during normal transport operations. Thus, the packaging device can be reused multiple times.

By means of the embodiment of the present invention, shearing strains, which can result in small warping or small deformation of the collecting tank, are introduced predominantly into the rear-sided panel of the collecting tank when the support frame deforms slightly due to impact shock. Thereafter the entire packaging device remains functional for renewed use. Moreover, such a design of the packaging device allows the collecting tank to be cleaned in a simple manner.

Furthermore, it is advantageous that according to the present invention the receiving mechanisms for the pancakes within the collecting tank are designed as self-supporting mandrels with at least one longitudinal groove and a moveable stop and are freely accessible from a front side, since in this manner an automatic loading and unloading of the collecting tank and thus the introduction of the packaging device into the integrated flow of material is rendered possible in an inexpensive manner.

One embodiment according to the present invention allows a dust-free storage of the pancakes to be transported, so that thus the danger of damage by means of soiling is virtually eliminated.

BRIEF DESCRIPTION OF THE DRAWINGS

The invention is explained in detail with the aid of a preferred embodiment with reference to the drawings in the following.

BEST MODE FOR CARRYING OUT THE INVENTION

Figure 1:
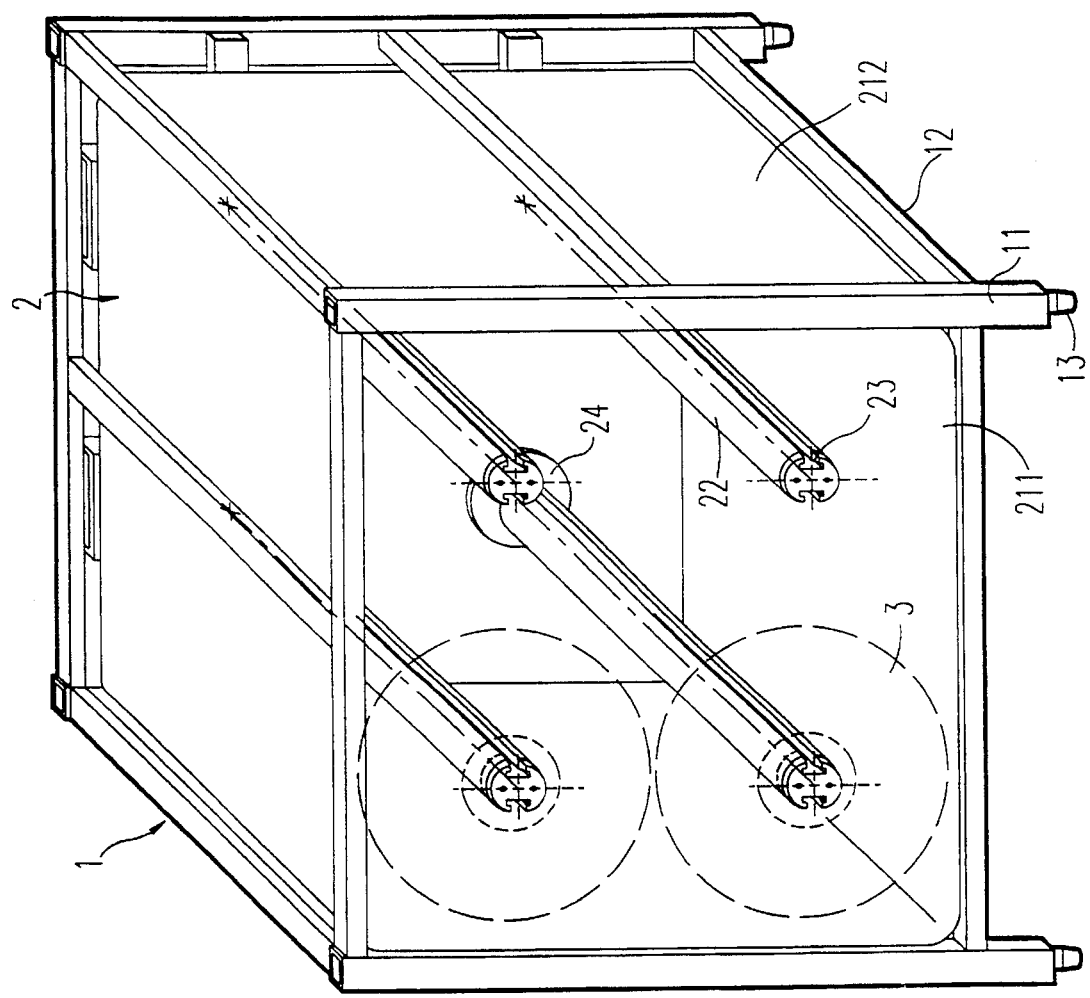
FIG. 1 is a perspective view of a packaging device according to the invention in the opened state.
Figure 2:
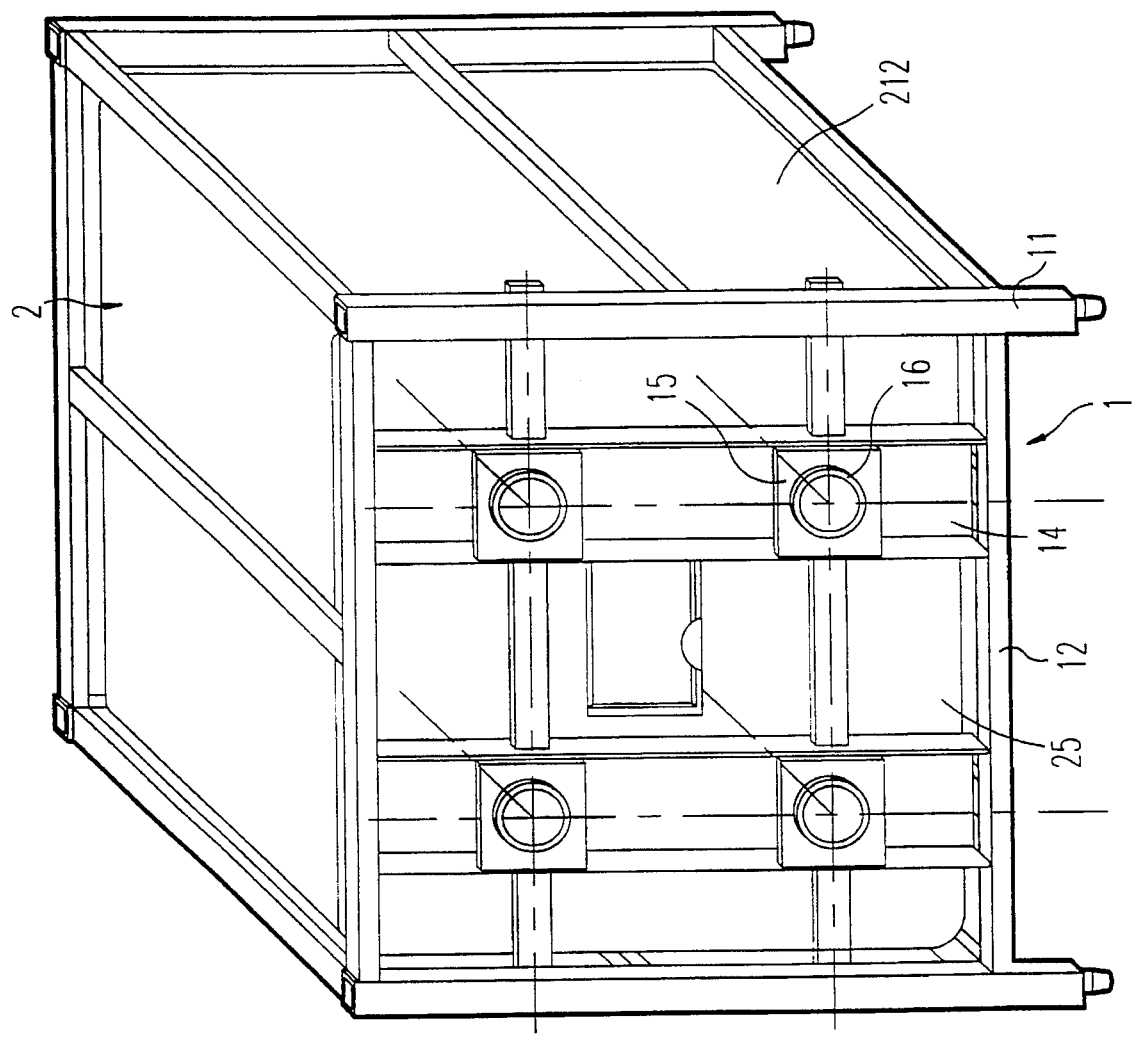
FIG. 2 is a perspective view of the rear side of a packaging device according to the invention.

According to FIGS. 1 and 2, a packaging device for magnetic tape reels 3 or pancakes comprises an outer box-shaped support frame 1 and an inner collecting tank 2, which is also box-shaped, both of which are open on one side, the feed side (211), wherein in the present case this side (211), forming the front side, is vertical. The support frame 1 is designed in such a manner as framework construction that it totally encloses the collecting tank 2. The support frame 1 is formed by a plurality of profiled stiles 11 and rungs 12, 14, which are connected together so as to form a cage. At the same time four tubular stiles 11 form the vertical corners of the cage, whereas the side members are formed by three tubular rungs 12, which are spaced horizontally at equal intervals and whose two faces are welded at right angles to the respective stiles 11. The bottom faces of the tubular stiles 11 are closed by means of protruding cones 13, which engage with the upper faces of the stiles 11 of a bottom packaging device when several packaging devices are stacked, thus providing a stable, immoveable connection. The front side of the support frame 1 is formed by means of two horizontal rungs 12, which are attached to the upper or bottom end segment of the respective stiles 11. On the rear side 25 of the support frame 1 are four rungs 12, which extend horizontally at vertical intervals and which penetrate two vertical rungs 14, which are made of a channel shape, are distributed uniformly over the width and are designed as steadying struts. The channel is stiffened at the formed intersecting points by means of a welded-in plate 15. Between the plate 15 and the base element of the channel is inserted a piece of pipe 16, which connects two opposite boreholes in the plate 15 or in the base element.

Instead of the support frame 1 that is described above, another conceivable construction for a statically specific framework could also be provided.

The inner collecting tank 2 has self-contained walls, which comprise several panels and a smooth, flat inner surface. The front side 211 of the collecting tank 2 is thus formed by a removeable cover plate 26, which is freely accessible from the front of the support frame 1. The rear side of the collecting tank 2 is attached self-supportingly to the support frame 11, so that between the side members 212 of the collecting tank 2 and the side members of the support frame 1 there remains a space or gap. In addition, the rear side 25 of the collecting tank 2 has a document container, which is freely accessible from the outside, to receive documents in DIN A4 and DIN A5 size.

The collecting tank 2 has several receiving mechanisms in the shape of horizontal mandrels 22 that run parallel to each other and that penetrate the rear side 25 of the collecting tank 2 at the recesses provided for this purpose and are clamped and/or cemented so as to be rigid to deflection into the pipe pieces 16 at the intersecting points of the rear side of the support frame. The distance between the mandrels 22 and/or relative to the side members 212 is selected in such a manner that no contact of two pancakes 3 which are slid on parallel to each other is possible among one another or with the side members 212. The length of the mandrel 22 corresponds to the width of a set of pancakes, i.e. a multiple of the width of a single pancake 3. Each mandrel 22 exhibits two opposing longitudinal grooves 23, which extend over the entire length of the mandrel 22. The front faces of the mandrels 22, which point in the direction of the open front side 211 of the collecting tank 2, are designed with a chamfered edge. A circular ring plate 24, whose face rests on the rear side 25 of the collecting tank 2, is slid on each mandrel 22. Two engaging hooks (not illustrated), which are guided in the two longitudinal grooves 23 of the respective mandrel 22, project at right angles from the other face of the circular ring plate 24. The diameter of the circular ring plate 24 corresponds preferably to the diameter of a pancake core.

Figure 3:
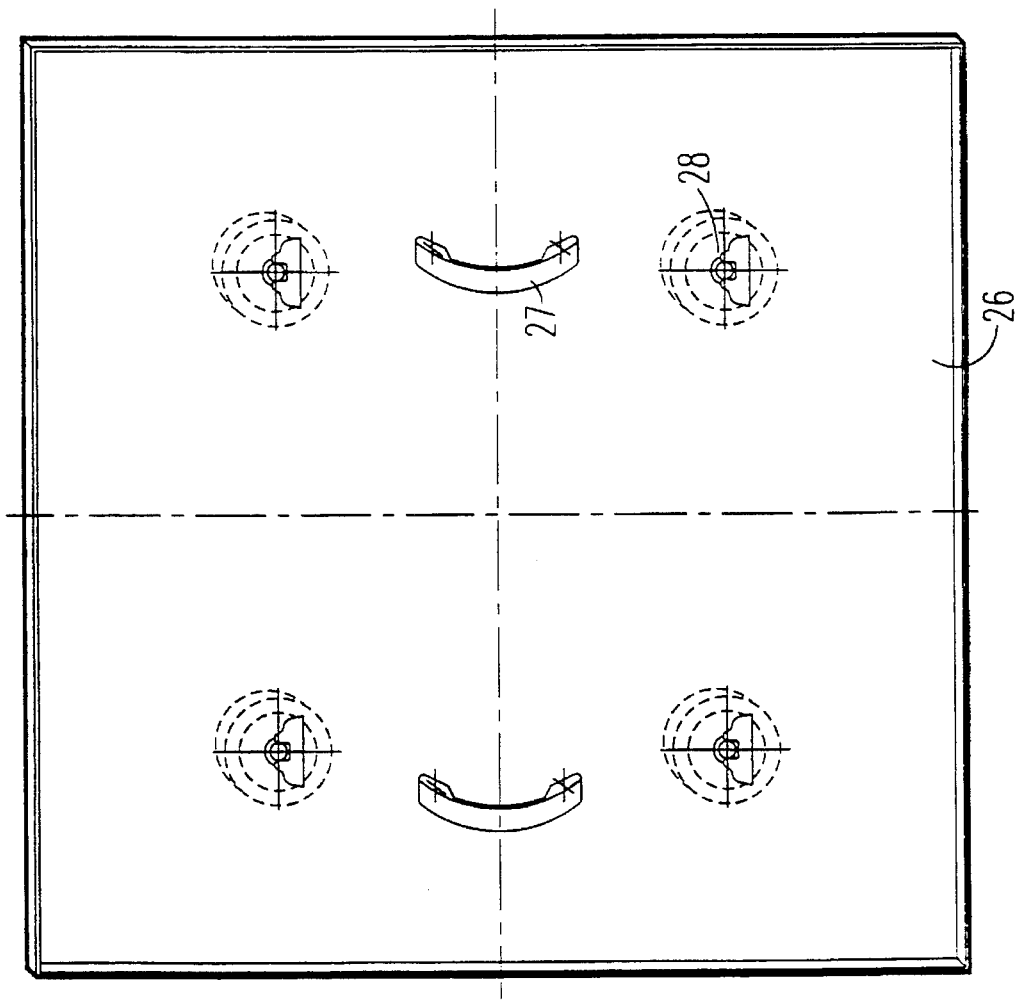
FIG. 3 is a top view of a front cover plate of a collecting tank.
Figure 4:
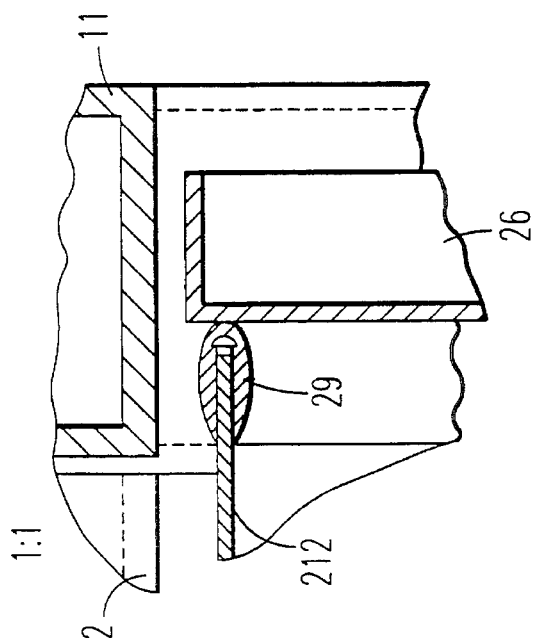
FIG. 4 is a cross sectional view with a seal between the cover plate and the collecting tank.

According to FIGS. 3 and 4, the cover plate 26 for the inner collecting tank 2 has a rectangular shape and is provided on its outwardly pointing side with two opposing handles 27. In accordance with the spatial arrangement of the mandrels 22, conventional clamp locks 28 are disposed on the outside of the cover plate, in order to fasten the cover plate 26 to the mandrels 22. The border of the cover plate 26 is bent outwardly at right angles so that a flat, stable shell is formed. The free rim of the collecting tank 2 is provided with a seal 29, which is slid like a piping over the free rim.

The function of the packaging device is described in the following.

Sets of pancakes are slid automatically with a loader on the respective mandrel 22 until the pancake 3 rests exactly against the circular ring plate 24 at the rear side 25 of the collecting tank 2. In this state the pancakes 3, arranged at this stage at the front side 211, lie essentially flush with the face of the respective mandrels 22. Following completion of the automatic loading process, the collecting tank 2 is closed by means of the cover plate 26. Upon actuating the clamp locks 28, the cover plate 26 draws close to the seal 29 of the collecting tank 2, thus closing the tank interior without dust; and the pancakes 3 are held together on the mandrels 22.

During transport of the packaging device any vibrations or impact shocks are absorbed by the support frame 1. Since the collecting tank 2 is clamped to the support frame 1 so as to hang freely, transfer of these vibrations to the collecting tank 2 is damped. In the case of severe impact shocks the introduced energy is converted into an elastic or partially plastic deformation of the support frame 1, whereby the jolts of the collecting tank 2 are damped and damage is avoided.

Instead of a unilateral, freely projecting clamping of the collecting tank 2, it could also be mounted on an air cushion or on an elastic, yielding material.

To unload the collecting tank 2, the cover plate 26 is lifted in a suitable manner from the front side 211 of the collecting tank 2 and the pancake sets are automatically removed with an unloader. To this end, the unloader has two receiving rails (not illustrated), which are inserted into the opposing longitudinal grooves 23 of the mandrels 22. The end section of the receiving rails has a prestressed engaging hook, which can engage with the respective hook of the circular ring plates 24. Thus, the circular ring plate 24 also serves on the unloader as an end stop. Since each mandrel 22 is provided with a chamfered front edge, it automatically centers itself when the unloader advances as far as the face of the mandrel 22, so that a reliable unloading is guaranteed.

The outer dimensions of the support frame 1 correspond to the conventional Europallet size with a width of 1000 mm, a height of 1092 mm and a depth of 1200 mm.

The support frame 1 and the inner collecting tank 2 are made preferably of steel, which can be coated with a layer of paint or zinc as protection against corrosion.

I claim:

1. Packaging device for magnetic tape reels, which comprises:

an outer support frame and an inner collecting tank which is mounted within the support frame, said collecting tank being attached to the support frame so as to overhang freely and having freely overhanging side members located so as to be distanced from the support frame; and at least one mandrel which protrudes freely from a side of the tank and is attached to the support frame in order to mount the magnetic tape reels.

2. Packaging device, as claimed in claim 1, wherein the support frame forms a cage comprising a plurality of rungs and stiles.

3. Packaging device, as claimed in claim 2, wherein the rungs and the stiles of the support frame are made of profile material.

4. Packaging device, as claimed in claim 1, wherein the interior of the support frame is freely accessible from the front or feed side.

5. Packaging device, as claimed in claim 4, wherein the collecting tank is open in the direction of a front side of the support frame.

6. Packaging device, as claimed in claim 1, wherein the mandrel is attached to the support frame so as to resist bending.

7. Packaging device, as claimed in claim 1, wherein said at least one mandrel comprises four mandrels spaced parallel to each other in the collecting tank.

8. Packaging device, as claimed in claim 1, wherein said at least one mandrel comprises a plurality of mandrels and wherein each mandrel has at least one longitudinal groove which extends over the entire length thereof.

9. Packaging device, as claimed in claim 1, wherein said at least one mandrel comprises a plurality of mandrels wherein a free end of each of the mandrels is chamfered.

10. Packaging device, as claimed in claim 1, which comprises a cover plate for the collecting tank wherein the at least one mandrel comprises a plurality of mandrels, the mandrels terminate in the plane of the front side of the collecting tank and the mandrels serve as holders for the cover plate.

11. Packaging device, as claimed in claim 10, wherein the cover plate is fixed in position on one of the free ends of the mandrels and the collecting tank by means of clamp locks.

12. Packaging device, as claimed in claim 1, wherein the at least one mandrel comprises a plurality of mandrels and an axially movable stop is slid onto the attached end of each of the mandrels.

13. Packaging device, as claimed in claim 12, wherein the stop comprises a circular ring plate with an engaging mechanism that is movable in a longitudinal groove of the respective mandrel.

14. Packaging device, as claimed in claim 1, wherein a peripheral seal is arranged on the opening rim of the collecting tank.

15. Packaging device, as claimed in claim 1, wherein, for stable stacking of several packaging devices, the support frame includes suitable connecting pieces located on an underside portion of the support frame in order to engage in corresponding plug formations on the upper side.

16. Packaging device, as claimed in claim 1, wherein the support frame and the collecting tank comprise galvanized steel.

17. Packaging device, as claimed in claim 1, wherein the support frame and the collecting tank are coated with a layer of paint.

18. Packaging device as claimed in claim 1, wherein the support frame and the collecting tank are welded.

19. Packaging device, as claimed in claim 1, wherein the dimensions of the support frame have a width of 1000 mm, a height of 1092 mm and a depth of 1200 mm.

* * * * *